US012791377B2

(12) United States Patent
Peterson

(10) Patent No.: US 12,791,377 B2
(45) Date of Patent: Nov. 10, 2026

(54) SYSTEMS AND METHODS FOR MEASURING WEIGHT OF A MOVING OBJECT

(71) Applicant: Tavaci Technologies LLC, Alpine, UT (US)

(72) Inventor: Sean R. Peterson, Payson, UT (US)

(73) Assignee: Tavaci Technologies LLC, Alpine, UT (US)

(*) Notice: Subject to any disclaimer, the term of this patent is extended or adjusted under 35 U.S.C. 154(b) by 291 days.

(21) Appl. No.: 18/765,083

(22) Filed: Jul. 5, 2024

(65) Prior Publication Data

US 2025/0012621 A1 Jan. 9, 2025

Related U.S. Application Data

(60) Provisional application No. 63/512,165, filed on Jul. 6, 2023, provisional application No. 63/512,129, filed on Jul. 6, 2023.

(51) Int. Cl.

*G01G 13/24* (2006.01)
*G01G 13/02* (2006.01)

(52) U.S. Cl.

CPC ........... *G01G 13/24* (2013.01); *G01G 13/026* (2013.01)

(58) Field of Classification Search

CPC .... G01G 13/24; G01G 13/026; G01G 11/003; G01G 19/03

See application file for complete search history.

(56) References Cited

U.S. PATENT DOCUMENTS

| | | | |
|---|---|---|---|
| 5,567,103 A | 10/1996 | Konstant |
| 5,822,920 A | 10/1998 | Tsay |
| 9,908,713 B2 | 3/2018 | Okazaki et al. |
| 10,306,847 B2 | 6/2019 | Whitcher et al. |
| 2002/0046696 A1 | 4/2002 | Lang |
| 2003/0116068 A1 | 6/2003 | Sauder et al. |
| 2006/0037520 A1 | 2/2006 | Tsing |

(Continued)

FOREIGN PATENT DOCUMENTS

| | | |
|---|---|---|
| CN | 209310900 U * | 8/2019 |
| CN | 212164498 U | 12/2020 |

(Continued)

OTHER PUBLICATIONS

International Search Report and Written Opinion mailed on Oct. 24, 2024 for PCT Patent Application No. PCT/US2024/036964.

*Primary Examiner* — Peter J Macchiarolo
*Assistant Examiner* — Mireille S Sadate-Moualeu
(74) *Attorney, Agent, or Firm* — Thomas | Horstemeyer, LLP

(57) ABSTRACT

The present disclosure presents systems and related methods for weighing a moving cart in a modular grow tower assembly. Such a method comprises moving a plurality of carts containing crops along a path; isolating a single cart from adjacent carts using a separator wheel with prongs that engage ribs on a bottom surface of the cart; positioning the isolated cart onto a load cell; measuring a pressure exerted by the isolated cart using the load cell while the isolated cart is in motion; recording the measured pressure as pressure data with a controller; and generating, by the controller, a histogram from the pressure data to determine a weight of the isolated cart.

15 Claims, 3 Drawing Sheets

(56) References Cited

U.S. PATENT DOCUMENTS

| | | | |
|---|---|---|---|
| 2006/0278726 | A1 | 12/2006 | Holly |
| 2011/0271887 | A1 | 11/2011 | Shoup |
| 2018/0235156 | A1 | 8/2018 | Blair et al. |
| 2018/0305123 | A1 | 10/2018 | Lert et al. |
| 2018/0359948 | A1 | 12/2018 | Millar et al. |
| 2019/0208722 | A1 | 7/2019 | Fevre et al. |
| 2020/0037524 | A1 | 2/2020 | Friedman |
| 2020/0039755 | A1 | 2/2020 | Millar et al. |
| 2020/0154647 | A1 | 5/2020 | Millar et al. |
| 2020/0236883 | A1 | 7/2020 | Ambrosi et al. |
| 2021/0007301 | A1 | 1/2021 | Do |
| 2022/0009715 | A1 | 1/2022 | Rongley |
| 2022/0201926 | A1 | 6/2022 | Bertram et al. |
| 2022/0221328 | A1 * | 7/2022 | Coffin .................... G01G 19/18 |
| 2022/0256790 | A1 | 8/2022 | Kaplita et al. |

FOREIGN PATENT DOCUMENTS

| | | | |
|---|---|---|---|
| CN | 112806186 | A | 5/2021 |
| IL | 290012 | B1 | 6/2023 |
| JP | 3174418 | U | 3/2012 |
| KR | 100850684 | B1 | 8/2008 |
| KR | 101849161 | B1 | 4/2018 |
| KR | 102514289 | B1 | 3/2023 |
| WO | 2014182600 | A1 | 11/2014 |
| WO | 2022241505 | A1 | 11/2022 |
| WO | 2022242531 | A1 | 11/2022 |

* cited by examiner

SYSTEMS AND METHODS FOR MEASURING WEIGHT OF A MOVING OBJECT

CROSS-REFERENCE TO RELATED APPLICATION

This application claims priority to U.S. provisional application entitled, "Systems and Methods for Measuring Weight of a Moving Object," having application No. 63/512,165, filed Jul. 6, 2023, and U.S. provisional application entitled, "Systems and Methods for Providing a Modular Grow Pod," having application No. 63/512,129, filed Jul. 6, 2023, each of which is entirely incorporated herein by reference.

TECHNICAL FIELD

Embodiments described herein generally relate to systems and methods for weighing a moving object and, more specifically, to a weigh station for weighing crops in a modular grow tower assembly.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, pets, and livestock, other countries and future populations may not have enough farmland to provide the appropriate amount of crops for these purposes.

SUMMARY

The present disclosure presents systems and related methods for weighing a moving cart in a modular grow tower assembly. In various embodiments, one such system comprises a weigh station configured to receive and weigh a cart moving along a path; a plurality of height supports adjustable to accommodate different cart sizes; a weight mounting plate coupled to the height supports, the weight mounting plate including an opening housing a load cell; a weight plate coupled to the load cell, including a plurality of skid bars for receiving the cart; a separator wheel configured to isolate the cart from adjacent carts on the path, wherein the separator wheel includes a plurality of prongs configured to engage with ribs on a bottom surface of the cart; a load cell configured to measure a pressure exerted by the cart on the weight plate while the cart is in motion; and/or a controller operatively connected to the load cell to receive and record pressure data and configured to generate a histogram from the pressure data to determine a weight of the cart.

Also disclosed herein is a method comprising moving a plurality of carts containing crops along a path; isolating a single cart from adjacent carts using a separator wheel with prongs that engage ribs on a bottom surface of the cart; positioning the isolated cart onto a load cell; measuring a pressure exerted by the isolated cart using the load cell while the isolated cart is in motion; recording the measured pressure as pressure data with a controller; and/or generating, by the controller, a histogram from the pressure data to determine a weight of the isolated cart.

The present disclosure additionally presents exemplary weigh stations in accordance with various embodiments. One such weight station for weighing a moving cart in a modular grow tower assembly comprises a weight mounting plate secured on a plurality of height supports; a separator wheel mounted to the weight mounting plate, the separator wheel having a plurality of prongs that engage ribs on a bottom surface of the moving cart; a load cell mounted on the weight mounting plate, configured to receive a weight plate; and/or a controller connected to the load cell to record and process weight measurements, wherein the separator wheel is driven by a motor to rotate at a speed faster than the speed of the moving cart to isolate the moving cart for accurate weighing.

In one or more aspects of such systems and methods and apparatuses, the weigh station is positioned at an entrance of the modular grow tower assembly to weigh an initial amount of material in the cart; the weigh station is positioned at an exit of the modular grow tower assembly to weigh an amount of material grown in the cart; each cart includes an electronic tracking tag; the electronic tracking tag comprises an RFID tag; the separator wheel is configured to create a vertical gap between the isolated moving cart and an adjacent cart by lifting the moving cart onto the skid bars; and/or the controller is further configured to reset load cell pressure readings whenever no pressure is detected, indicating that a new cart is ready to be weighed.

In one or more aspects, such systems and/or methods and/or apparatuses involve or comprise a plurality of sensors configured to read the electronic tracking tags; the sensors communicate with the controller to associate the pressure data with a corresponding cart; providing water, nutrients, or light to the isolated cart based on the determined weight to ensure crops contained in the isolated cart meets a desired growth weight; storing an initial weight of the isolated cart before crops are added to the isolated cart and using this initial weight to calculate a net weight of the crop contained in the isolated cart after determining the weight of the isolated cart; reading, by the controller, the electronic tracking tag and associating the pressure data with the isolated cart using the electronic tracking tag; and/or a retrieving mechanism configured to pull the moving cart onto and off the weight plate.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for weighing carts containing crops in a modular grow tower. In general, a modular grow tower assembly moves carts containing crops, plant matter, or other biological matter that traverse the tower assembly via a moving path (e.g., serpentine moving path, circular moving path, curved or straight moving path, etc.). An exemplary modular grow tower system is configured for pushing and/or pulling a plurality of carts along a track using pushing/pulling mechanisms that are placed periodically across the width of the track. Furthermore, a lift system including a plurality of lifts may be provided for raising or lowering the plurality of carts throughout the modular tower assembly of the modular grow tower system.

Some embodiments provided herein include systems and methods for maintaining crops (e.g., plant or biological material) in the plurality of carts as the carts traverse a serpentine moving path of the modular tower assembly. These embodiments may include mechanisms for receiving a cart from a growing row; harvesting crops from the cart, sanitizing the cart, seeding the cart, and putting the seeded cart back in circulation in the modular grow tower.

Crops may include traditional agricultural materials, for example, seeds, seedlings, crops, grasses, fully-grown crops, leafy crops, crop output, such as seeds, nuts, fruit, and/or the like. Crops may also include non-traditional materials, for example, microgreens, eggs, algae, insects, insect larvae, fungi, other kinds of organic material, and/or the like. The system may include a weigh station which is configured to isolate a single cart from any other carts in order to accurately weigh the single cart. The system may further include a controller for controlling the weigh station and recording the weight information obtained by the station.

Figure 1:
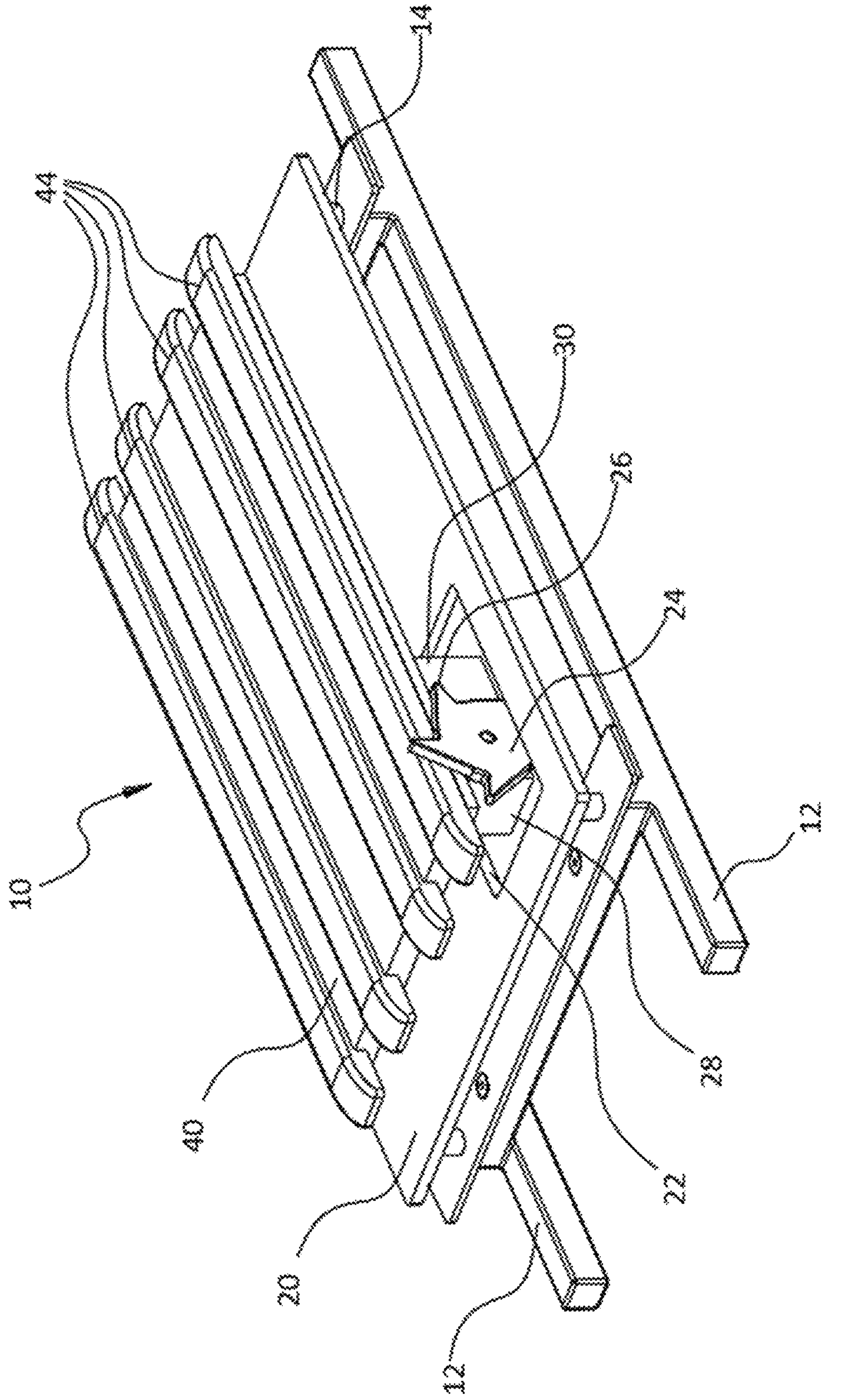
FIG. 1 depicts a perspective view of a weigh station for weighing a moving object, such as a cart according to one or more embodiments shown and described herein.

Referring now to the drawings, FIG. 1 provides a weigh station 10 for weighing carts 300 in a modular grow tower. The weigh station 10 may comprise a plurality of mounting supports 12 which may be configured to secure the weigh station 10 to the modular grow tower. The weigh station 10 may further include a plurality of height supports 14, which may be configured to alternate the height of the weigh station 10 based on the size of the carts 300 being weighed.

As further illustrated in FIG. 1, a weight mounting plate 20 may be secured on the plurality of height supports 14. In some embodiments, the weight mounting plate 20 may be removably coupled to the height supports 14. The mounting plate 20 may further include an opening 22, which may be configured to house a load cell 30 and a separator wheel 24 which may include a plurality of prongs 26. A weight plate 40 may be coupled to the load cell 30, and may further include a plurality of skid bars 44 for receiving the carts 300. In some embodiments, the load cell 30 may be connected to a controller, which may be configured to record weight readings obtained by the load cell 30.

In some embodiments, the mounting supports 12 may be mounted to a position corresponding to the entrance of the modular grow tower (and/or a beginning of a cycle), such that the weigh station 10 weighs an initial amount of crops present in carts 300. In other embodiments, the mounting supports 12 may be mounted to a position corresponding to an exit of the modular grow tower (and/or an ending of the cycle), such that the weigh station 10 weighs the amount of crops grown in the cart 300 once the cart 300 has traversed the modular grow tower. In these embodiments, the weigh station 10 may weigh carts 300 to ensure that the carts 300 have received a predetermined amount of crops when entering the modular grow tower assembly, or to ensure that the carts 300 have produced a predetermined amount of crops when exiting the modular grow tower assembly.

As the carts 300 traverse the modular grow tower, one or more external factors may impact the weight of the carts 300. For example, the carts 300 may receive nutrients and water at various locations throughout the modular grow tower. As a result, the mounting supports 12 may be mounted in a position corresponding with a location between a beginning and end of a cycle in the modular grow tower, such that the weigh station 10 may be configured to weigh the crops present in the cart 300 at a midway point in the growing process of the modular grow tower to ensure that the crops is growing according to projections.

As the carts 300 are moved through the modular grow tower towards the location where the weigh station 10 is mounted, the carts 300 may be configured such that each cart 300 is in contact with an adjacent cart 300 on both a front end and a back end. In some embodiments, the carts 300 may be isolated from their adjacent carts 300 in order to obtain an accurate weight reading. In this embodiment, the separator wheel 24 may be configured to mechanically isolate the carts 300 from their adjacent carts 300.

Figure 2:
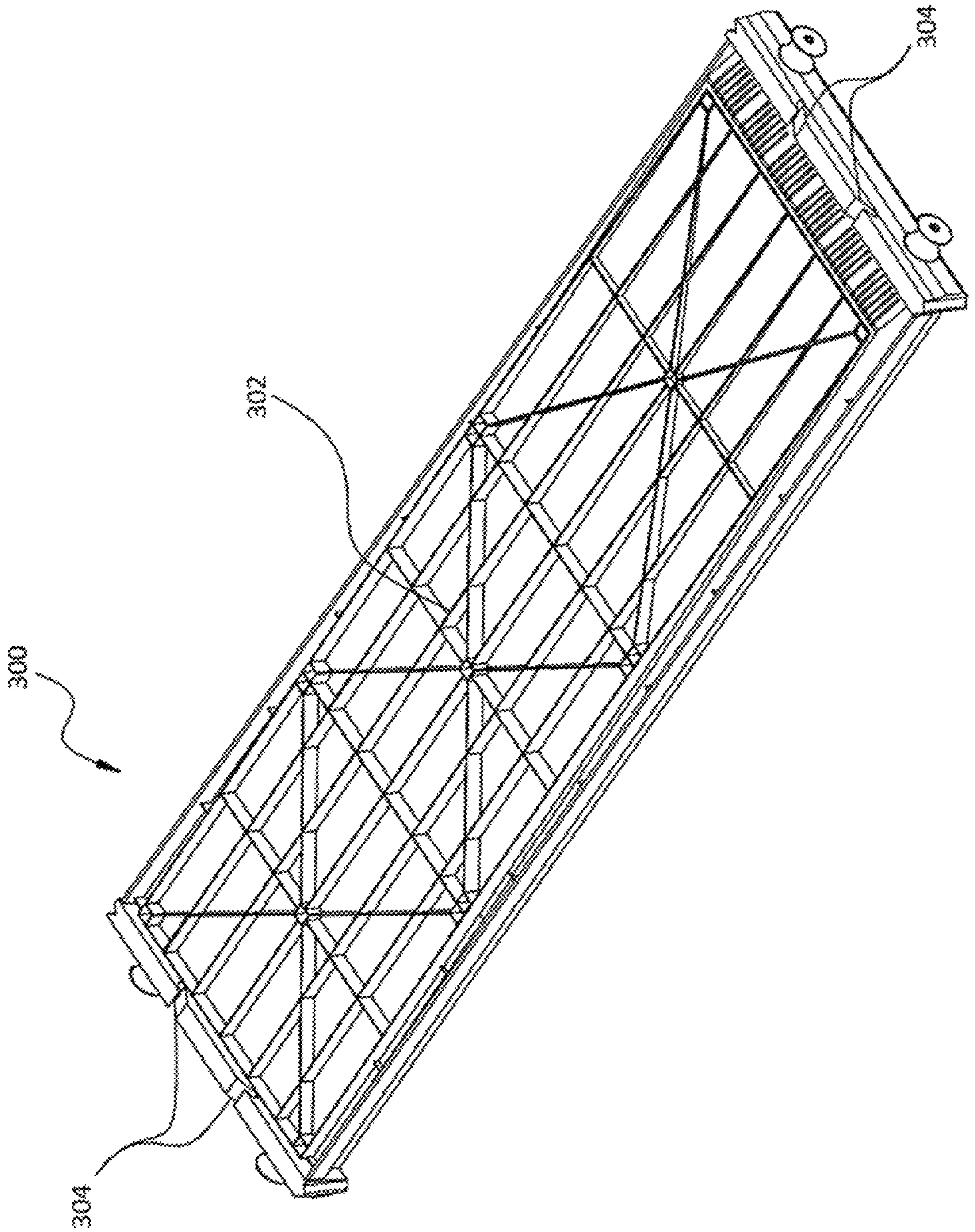
FIG. 2 depicts a bottom view of a moving object, such as a cart, to be weighed by the weigh station of FIG. 1 according to one or more embodiments shown and described herein.

Referring still to FIG. 1, the separator wheel 24 may be connected to a motor 28, such as a 12V DC motor, which may be configured to rotate the separator wheel 24 at a speed which is slightly faster than the speed at which the carts 300 traverse the modular grow tower. In some embodiments, the controller may be further configured to turn the motor 28 of the separator wheel 24 on and off, and may also be configured to control the rotational speed of the separator wheel 24. As the separator wheel 24 rotates, the prongs 26 of the separator wheel 24 may engage with a plurality of ribs 302 located on a bottom surface of the cart 300, as illustrated in FIG. 2. Once one or more of the plurality of prongs 26 has engaged one or more of the plurality of ribs 302 of the cart 300, the rotational motion of the separator wheel may act to pull the cart 300 onto the skid bars 44 of the load cell 30.

As the separator wheel 24 pulls the cart 300 onto the skid bars 44 of the weight plate 40, the rotation of the separator wheel 24 may further act to separate the cart 300 from its adjacent cart 300 in the modular grow tower. In some embodiments, the rotation of the separator wheel 24 may create a lateral gap between the cart 300 and its adjacent carts 300, such that the cart 300 is the only cart 300 in contact with the weight plate 40. In other embodiments, the skid bars 44 of the weight plate 40 may be elevated above the modular grow tower, such that the rotation of the separator wheel 24 may raise the cart 300 onto the skid bars 44 and create a vertical gap between the cart 300 to be weighed and its adjacent carts 300.

Although not illustrated herein, other embodiments of the weigh station 10 may include a retrieving mechanism, such as an actuator, for pulling the carts 300 from the modular grow tower and onto the weigh station 10. The retrieving mechanism may be configured to extend to an extended position to engage with the carts 300, and retract to a retracted position to pull the carts 300 onto the weight plate 40. In some embodiments, the retrieving mechanism may be configured to engage with the ribs 302 of the carts 300.

As the carts 300 are pulled onto the plurality of skid bars 44, the load cell 30 may be configured to read the weight of the cart 300 while the cart 300 is in motion. In some embodiments, the load cell 30 may be configured to read the pressure exerted on the load cell 30 by the cart 300 in order to determine the weight of the cart 300.

The load cell 30 may be further configured to actively read the pressure exerted on the weight plate 40 for the entire period of time the cart 300 is in contact with and traversing the weight plate 40. In some embodiments, the cart 300 may remain in contact with the weight plate 40 for approximately one minute, although it should be understood that any period of time may be within the scope contemplated by the present disclosure.

As the load cell 30 reads the pressure exerted by the cart 300 on the weight plate 40, the load cell 30 may be configured to convey the readings to the controller, which may be configured to record the measurements obtained by the load cell 30. As the controller records the pressure readings, the controller may be further configured to output a histogram which illustrates the pressure readings obtained by the load cell 30 from a time when the cart 300 first interacts with the weight plate 40 to a time when the cart 300 is fully removed from the weight plate 40.

Initially, the pressure readings obtained by the load cell 30 may be uneven as the cart 300 first interacts with the weight plate 40, as the entirety of the cart 300 may not be secured on the weight plate 40. However, as the cart 300 moves across the weight plate 40, the pressure readings may stabilize, which may be indicated in the histogram generated by the controller in the form of a plateau. As the cart 300 begins to move off of the weight plate 40, the pressure readings may necessarily drop once again, which may indicate to the controller that the cart 300 is exiting the weigh station 10.

Once the cart 300 has exited the weigh station 10, the weight of the cart 300 may be determined by analyzing the weight value of the plateau of the histogram generated by the controller. In some embodiments, the pressure readings obtained by the load cell 30 may be conveyed to the controller in measurements of grams and/or pounds, such that the plateau of the histogram generated by the controller indicates the weight of the cart 300. In this embodiment, the plateau of the histogram may indicate the weight of the cart 300 with a margin of error of approximately plus or minus two percent.

In some embodiments, the load cell 30 may be configured to reset its pressure readings whenever a cart 300 is removed from the weight plate 40, such that the load cell 30 is capable of differentiating between carts 300 in the modular grow tower. In this embodiment, whenever the load cell 30 records that no pressure is being exerted on the weight plate 40, the load cell 30 will convey to the controller that the weighing process has been completed for the cart 300, and that a new cart 300 is preparing to engage the weigh station 10. At this point, the controller may save the pressure data and histogram generated for the cart 300, and prepare to obtain new pressure readings from the load cell 30 related to the new cart 300.

In other embodiments, each of the carts 300 may include an electronic tracking tag, such as an RFID or NFC tag, which uniquely identifies each cart 300. The weigh station 10 may further include a plurality of sensors which are configured to read the tags located on the carts 300. In this embodiment, the plurality of sensors may be configured to communicate with the controller. When the tag of the cart 300 is scanned, the controller may begin recording pressure data obtained by the load cell 30, and may continue to record pressure data until one of the plurality of sensors scans the tag of a new cart 300. Once the tag of a new cart 300 is scanned, the controller may be configured to begin recording a new set of pressure data that relates to the new cart 300.

Once the cart 300 has been weighed by the weigh station 10, the cart 300 may be pulled from the weigh station 10 by an actuating mechanism. In some embodiments, the actuating mechanism may be a component of the weigh station 10. In other embodiments, the actuating mechanism may be a separate component integrated into the modular grow tower at a location near the weigh station 10. In either embodiment, the actuating mechanism may be configured to extend to an extended position to engage the cart 300 located on the weigh station 10. In some embodiments, the actuating mechanism may engage the carts 300 via the same ribs 302 which are used to engage the prongs 26 of the separator wheel 24. In other embodiments, the actuating mechanism may be configured with at least one latch, which may be configured to engage a notch 304 located on a side of the cart 300.

Once the actuating mechanism has engaged the cart 300, the actuating mechanism may retract to a retracted position, such that the cart 300 positioned on the weigh station 10 is pulled off the weigh station 10. In embodiments where the weigh station 10 is positioned at the beginning or in the middle of the modular grow tower, the cart 300 may be pulled from the weigh station 10 and onto the modular grow tower. In embodiments where the weigh station is positioned at the end of the modular grow tower, the carts 300 may be pulled from the weigh station 10 and into a harvesting station, where the crops contained by the carts 300 may be harvested. In order to ensure that only one cart 300 is positioned on the weight plate 40 at a time, the actuating mechanism may be configured to pull a cart 300 from the weigh station 10 prior to the separator wheel 24 pulling a new cart 300 onto the weigh station 10.

Referring now to FIG. 1, the manner in which the moving carts 300 of the modular grow tower assembly are weighed by the weigh station 10 in an exemplary embodiment will be described. Initially, the carts 300 may traverse the modular grow tower in such fashion that each cart 300 is connected to an adjacent cart 300 on a front end and a back end. As a lead cart 300 approaches the weigh station 10, at least one of the plurality of sensors may scan the tag located on the cart 300, such that the at least one of the plurality of sensors communicates to the controller that a cart is approaching the weigh station 10 to be weighed.

As the cart 300 approaches the weigh station 10, the controller may activate the motor 28 of the separator wheel 24, such that the separator wheel begins to rotate at a speed which is faster than the speed at which the carts 300 are traversing the modular grow tower. The separator wheel 24 may continue to rotate until at least one or more of the plurality of prongs 26 of the separator wheel 24 has engaged a rib 302 located on the bottom of the lead cart 300. Once the prong 26 is engaged with the rib 302, the rotation of the separator wheel 24 may act to pull the lead cart 300 onto the skid bars 44 of the weight plate 40.

As the lead cart 300 is pulled onto the weight plate 40, the load cell 30 may begin to obtain pressure readings resulting from the pressure the lead cart 300 places on the weight plate 40. As the load cell 30 monitors the pressure readings, the load cell 30 may output the readings to the controller, which may generate a histogram of the pressure readings obtained by the load cell 30 in real time, such that the weight of the cart 300 is provided in a measurement of grams and/or pounds and/or ounces.

The load cell 30 may be configured to continuously obtain pressure readings as the cart 300 moves over the weight plate 40. Initially, the pressure readings may necessarily increase as the entirety of the cart 300 moves onto the weight plate 40. However, once the lead cart 300 is fully secured on the weight plate 40, the pressure readings may temporarily stabilize, which may be represented in the histogram generated by the controller in the form of a plateau. As the cart 300 begins to move off of the weight plate 40, the pressure readings obtained by the load cell 30 may necessarily decline, until the lead cart 300 is fully removed from the weight plate 40, at which point no pressure readings may be available.

As the pressure readings obtained by the load cell 30 begin to decrease, the controller may be configured to activate the actuating mechanism to pull the cart 300 from the weight plate 40. Once activated, the actuating mechanism may extend to the extended position, engage the lead cart 300, and retract to the retracted position, thereby pulling the cart 300 from the weight plate 40.

Once the lead cart 300 has been removed from the weight plate 40, the plurality of sensors may be configured to scan the tag of its adjacent cart 300, and indicate to the controller that a new cart 300 is in position to be weighed. At this point, the controller may activate the separator wheel 24 to pull the new cart 300 onto the weight plate 40, such that the load cell 30 may begin to obtain pressure readings from the new cart 300. As the new cart 300 moves across the weight plate 40, the load cell 30 may continuously transfer pressure data to the controller, thereby enabling the controller to generate a histogram of pressure readings as the new cart 300 moves across the weight plate 40. When the load cell 30 reads that the pressure readings have started declining, the actuating mechanism may be activated to remove the new cart 300 from the weight plate 40. This process may be repeated until each of the plurality of the carts 300 in the modular grow tower have been weighed.

Although the foregoing embodiments contemplate mechanically isolating the carts 300 prior to positioning the carts 300 on the weigh station 10, in some embodiments, the controller may be configured to record the weight of cart 300 while the cart 300 remains engaged with its adjacent carts 300. In this embodiment, the load cell 30 may still be configured to obtain pressure readings from a cart 300 positioned on the weight plate 40 of the weigh station 10, and to communicate the pressure readings to the controller. However, in this embodiment, the controller may be configured to generate a new histogram of pressure readings each time a new tag of any of the plurality of carts 300 is scanned by one of the plurality of sensors, even if the cart 300 being weighed is still positioned on the weigh station 10. While this embodiment may result in increased variation in the pressure readings obtained by the load cell 30, the resulting histograms generated by the controller for each cart 300 may still comprise a plateau which indicates the approximate weight of the cart 300.

Additionally, weigh station 10 may be configured to weigh the carts 300 prior to the carts 300 receiving crops. In some embodiments, the weight of the plurality of carts 300 can vary by approximately ten percent per cart 300. As a result, some embodiments first determine the weight of the carts 300 before receiving crops to determine the weight of crops present in a cart at various stages of the modular grow tower.

In this embodiment, each of the carts 300 may be moved through the weigh station 10 prior to receiving crops. As the carts 300 are weighed, the controller may be configured to store the weight values of the carts 300 and associate the stored weight values with the tag located on each cart 300.

In some embodiments, once the controller has obtained the weight value of each individual cart 300, the carts 300 may be filled with crops. After each cart 300 has received crops, the cart 300 may be weighed by the weigh station 10 a second time to ensure that the cart 300 has received the appropriate amount of crops. In order to confirm that the cart 300 has received the appropriate amount of crops, the controller may be configured to determine the weight of crops in the cart 300 by subtracting the weight of the empty cart 300 from the weight value that corresponds with the plateau of the histogram generated by the controller when the cart is weighed the second time.

Once the controller has confirmed that the appropriate amount of crops is present in each cart 300, the carts 300 may be placed into the modular grow tower. As the carts 300 with crops traverse the modular grow tower and approach the weigh station 10, the plurality of sensors may be configured to scan the tag of the cart approaching the weigh station 10 and indicate to the controller the specific cart 300 which will be positioned on the weight plate 40. Once the cart 300 has moved across the weight plate 40, and the load cell 30 has communicated the pressure readings to the controller, the controller may be configured to determine the weight of crops in the cart 300 by subtracting the weight of the empty cart 300 from the weight value that corresponds with the plateau of the histogram generated by the controller. By recording the weight of crops in the cart 300 prior to placing the cart 300 and continuing to record the weight of crops in the cart 300 as the cart 300 traverses the, it is possible to ensure that the appropriate amount of crops is present in each cart 300 throughout the growing process.

In some embodiments, if the controller determines that the weight of crops in the cart 300 is lower than a desired or target growth weight, the modular grow tower may be configured to adjust the treatment of the crops in the cart 300 to remedy the deficiency. For example, as the cart 300 traverses the modular grow tower, the cart 300 may be provided additional water, nutrients, and/or light to encourage growth of the crops. In this embodiment, the cart 300 may traverse the modular grow tower multiple times prior to the crops achieving the desired weight. Additionally, if the controller determines that the weight of crops in the cart 300 is lower than a desired weight, this may provide an indication that there is a malfunction in the cart. For example, if the weight of crops in the cart 300 is lower than a desired weight, this may provide an indication that a leak, or other similar malfunction, is present in the cart 300.

In other embodiments, if the controller determines that the weight of crops in the cart 300 meets and/or exceeds the desired weight, the modular grow tower may remove the cart 300 for harvesting.

Figure 3:
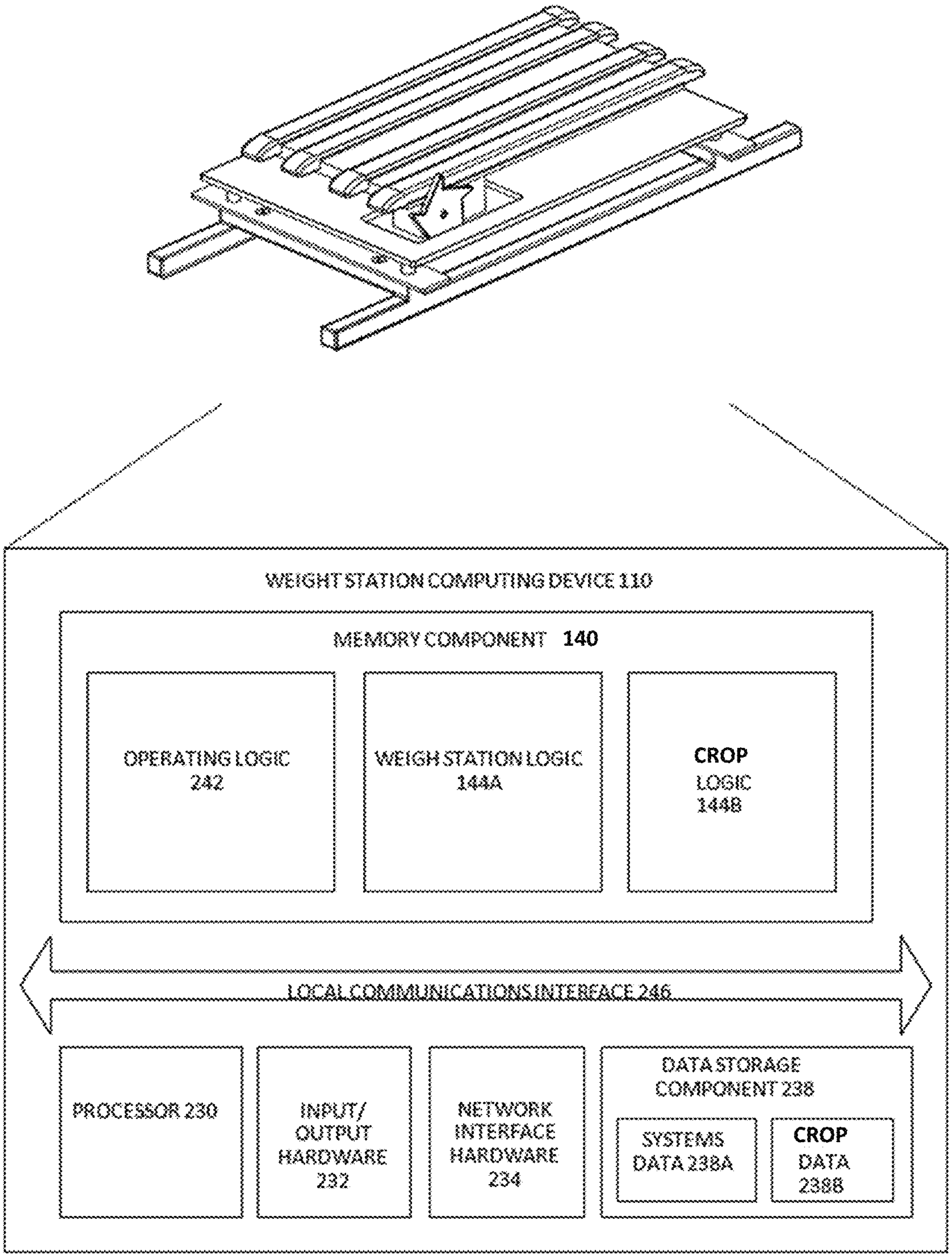
FIG. 3 depicts a weigh station computing device, according to one or more embodiments shown and described herein.

Referring now to FIG. 3, a weigh station computing device 110 is shown. As discussed above, the weigh station computing device 110 includes a memory component 140, a processor 230, input/output hardware 232, network interface hardware 234, and a data storage component 238 (which stores weigh station data 238A, crop data 238B, and/or other data). Each of the components of the weigh station computing device 110 may be communicatively coupled to a local communications interface 246. The local communications interface 246 is generally not limited by the present disclosure and may be implemented as a bus or other communications interface to facilitate communication among the components of the master controller coupled thereto.

The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, these non-transitory computer-readable mediums may reside within or outside the weigh station computing device 110. The memory component 140 may store, for example, operating logic 242, the weigh station logic 144A, and the crop logic 144B. The operating logic 242, the weigh station logic 144A and the crop logic 144B may each include a plurality of different pieces of logic, each of which may be embodied as a computer program, firmware, and/or hardware, as an example.

The operating logic 242 may include an operating system and/or other software for managing components of the weigh station computing device 110. As discussed above, the weigh station logic 144A and the crop logic 144B may reside in the memory component 140 and may be configured to perform the functionality, as described above. In some embodiments, the weigh station logic 144A and the crop logic 144B may reside on different computing devices. As an example, one or more of the functionalities and/or components described herein may be provided by a user computing device and/or remote computing device. While the weigh station computing device 110 is illustrated with the weigh station logic 144A and the crop logic 144B as separate logical components, this is only an example. In some embodiments, a single piece of logic (and/or several linked modules) may cause the weigh station computing device 110 to provide the described functionality.

The processor 230 may include any processing component operable to receive and execute instructions (such as from the data storage component 238 and/or the memory component 140). Illustrative examples of the processor 230 include, but are not limited to, a computer processing unit (CPU), a many integrated core (MIC) processing device, an accelerated processing unit (APU), a digital signal processor (DSP). In some embodiments, the processor 230 may be a plurality of components that function together to provide processing capabilities, such as integrated circuits (including field programmable gate arrays (FPGA)) and the like.

The input/output hardware 232 may include and/or be configured to interface with microphones, speakers, a display, and/or other hardware. That is, the input/output hardware 232 may interface with hardware that provides a user interface or the like. The user interface may include a graphical user interface (GUI) comprising various interactive elements such as buttons, menus, display graphs, icons, sliders, and text fields. The GUI is designed to facilitate easier user interaction with the system, providing visual representations of data and controls to improve the overall usability and efficiency of the system. The graphical elements may be arranged in a layout that is intuitive and accessible, allowing users to navigate the interface and perform desired actions with improved case.

The network interface hardware 234 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the weigh station computing device 110 and other computing devices, such as a user computing device, a remote computing device, and/or other devices.

The data storage component 238 may generally be any medium that stores digital data, such as, for example, a hard disk drive, a solid state drive (SSD), a compact disc (CD), a digital versatile disc (DVD), a Blu-Ray disc, and/or the like. It should be understood that the data storage component 238 may reside local to and/or remote from the weigh station computing device 110 and may be configured to store one or more pieces of data and selectively provide access to the one or more pieces of data.

It should be understood that while the components in FIG. 3 are illustrated as residing within the weigh station computing device 110, this is merely an example. In some embodiments, one or more of the components may reside external to the weigh station computing device 110. It should also be understood that, while the weigh station computing device 110 is illustrated as a single device, this is also merely an example. That is, the weigh station computing device 110 may represent a plurality of devices that are communicatively coupled to one another and provide the functionality described herein.

Additionally, while the weigh station computing device 110 is illustrated with the various logic components (e.g., the operating logic 242, the weigh station logic 144A, and the crop logic 144B) and data components (e.g., the weigh station data 238A and the crop data 238B) as separate components, this is also an example. In some embodiments, a single piece of logic (and/or a plurality of linked modules) and/or a single data component (and/or a plurality of linked modules) may also cause the weigh station computing device 110 to provide the functionality described herein.

Similarly, while the weigh station computing device 110 is depicted in a "PC" environment, it should be understood that at least some embodiments may not be limited in this way. Specifically, some embodiments may be configured such that the weigh station computing device 110 is configured as and/or includes a programmable logic controller (PLC) and/or other computing infrastructure.

While the embodiments described and illustrated herein have been related to the use of the weigh station 10 in a modular grow tower, it should also be noted that the disclosed weigh station may be capable of being used in a number of alternate environments. For example, the weigh station 10 may be integrated into semi-truck weigh stations, railroad weigh stations, or the like, such that the carts 300 and crops may be weighed during transit. By weighing the carts 300 throughout the transit process, it may be possible to cut down on the time and resources required to prepare the carts 300 for receiving crops once the carts 300 have arrived at the location of the modular grow tower.

From the above, it is to be appreciated that defined herein is a system and method for weighing moving objects in a modular grow tower, including a weigh station for mechanically isolating the objects and weighing the objects.

While particular embodiments have been illustrated and described herein, it should be understood that various other changes and modifications may be made without departing from the scope of the claimed subject matter. For example, the weigh station provided herein may be utilized in a number of alternate environments beyond the modular grow tower. Additionally it should be noted that the embodiments described herein are not mutually exclusive, such that the plurality of carts may be measured both while the cart is moving and/or connected to other carts. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for weighing a moving cart in a modular grow tower assembly comprising:

a weigh station configured to receive and weigh a cart moving along a path;

a plurality of height supports adjustable to accommodate different cart sizes;

a weight mounting plate coupled to the height supports, the weight mounting plate including an opening housing a load cell;

a weight plate coupled to the load cell, including a plurality of skid bars for receiving the cart;

a separator wheel configured to isolate the cart from adjacent carts on the path, wherein the separator wheel includes a plurality of prongs configured to engage with ribs on a bottom surface of the cart;

a load cell configured to measure a pressure exerted by the cart on the weight plate while the cart is in motion; and a controller operatively connected to the load cell to receive and record pressure data and configured to generate a histogram from the pressure data to determine a weight of the cart.

2. The system of claim 1, wherein the weigh station is positioned at an entrance of the modular grow tower assembly to weigh an initial amount of material in the cart.

3. The system of claim 1, wherein the weigh station is positioned at an exit of the modular grow tower assembly to weigh an amount of material grown in the cart.

4. The system of claim 1, wherein each cart includes an electronic tracking tag, the system further comprising:

a plurality of sensors configured to read the electronic tracking tags;

wherein the sensors communicate with the controller to associate the pressure data with a corresponding cart.

5. The system of claim 4, wherein the electronic tracking tag comprises an RFID tag.

6. The system of claim 1, wherein the separator wheel is configured to create a vertical gap between the isolated moving cart and an adjacent cart by lifting the moving cart onto the skid bars.

7. A method for weighing a moving cart in a modular grow tower assembly comprising:

moving a plurality of carts containing crops along a path;

isolating a single cart from adjacent carts using a separator wheel with prongs that engage ribs on a bottom surface of the cart;

positioning the isolated cart onto a load cell;

measuring a pressure exerted by the isolated cart using the load cell while the isolated cart is in motion;

recording the measured pressure as pressure data with a controller; and generating, by the controller, a histogram from the pressure data to determine a weight of the isolated cart.

8. The method of claim 7, further comprising providing water, nutrients, or light to the isolated cart based on the determined weight to ensure crops contained in the isolated cart meets a desired growth weight.

9. The method of claim 7, further comprising storing an initial weight of the isolated cart before crops are added to the isolated cart and using this initial weight to calculate a net weight of the crop contained in the isolated cart after determining the weight of the isolated cart.

10. The method of claim 7, wherein the controller is further configured to reset load cell pressure readings whenever no pressure is detected, indicating that a new cart is ready to be weighed.

11. The method of claim 7, wherein the isolated cart includes an electronic tracking tag, the method further comprising:

reading, by the controller, the electronic tracking tag and associating the pressure data with the isolated cart using the electronic tracking tag.

12. The method of claim 7, wherein the separator wheel is configured to create a vertical gap between the isolated cart and an adjacent cart by lifting the moving isolated cart onto skid bars.

13. A weigh station for weighing a moving cart in a modular grow tower assembly comprising:

a weight mounting plate secured on a plurality of height supports;

a separator wheel mounted to the weight mounting plate, the separator wheel having a plurality of prongs that engage ribs on a bottom surface of the moving cart;

a load cell mounted on the weight mounting plate, configured to receive a weight plate;

a controller connected to the load cell to record and process weight measurements; and wherein the separator wheel is driven by a motor to rotate at a speed faster than the speed of the moving cart to isolate the moving cart for accurate weighing.

14. The weigh station of claim 13, wherein the separator wheel is configured to create a vertical gap between the isolated moving cart and an adjacent cart by lifting the moving cart onto skid bars.

15. The weigh station of claim 13, further comprising a retrieving mechanism configured to pull the moving cart onto and off the weight plate.

* * * * *